United States Patent [19]

Jonsson

[11] Patent Number: 4,947,309
[45] Date of Patent: Aug. 7, 1990

[54] METHOD AND MEANS FOR CONTROLLING A BRIDGE CIRCUIT

[76] Inventor: Ragnar Jonsson, Kyrkobacksvagen 5, S-271 00 Ystad, Sweden

[21] Appl. No.: 375,025
[22] PCT Filed: Oct. 8, 1987
[86] PCT No.: PCT/SE87/00581
§ 371 Date: Jul. 20, 1989
§ 102(e) Date: Jul. 20, 1989
[87] PCT Pub. No.: WO88/04491
PCT Pub. Date: Jun. 16, 1988

[30] Foreign Application Priority Data
Dec. 9, 1986 [SE] Sweden ............... 8605266

[51] Int. Cl.⁵ ............. H02M 3/335; H02M 7/5387
[52] U.S. Cl. .......................... 363/17; 363/37; 363/41; 363/98; 363/132; 323/235; 323/285
[58] Field of Search ................... 363/16–17, 363/37, 95, 97, 98, 132, 41; 323/235, 282, 285, 319

[56] References Cited

U.S. PATENT DOCUMENTS

| | | |
|---|---|---|
| 3,875,496 | 4/1975 | Carsten . |
| 4,244,016 | 1/1981 | Mitchell ............... 363/98 |
| 4,535,399 | 8/1985 | Szepesi ............... 363/41 |
| 4,550,365 | 10/1985 | Foch et al. . |
| 4,609,983 | 9/1986 | Braun ................ 363/98 |
| 4,615,000 | 9/1986 | Fujii et al. ............ 363/98 |
| 4,761,727 | 8/1988 | Kammiller ............ 363/98 |

Primary Examiner—Peter S. Wong
Attorney, Agent, or Firm—Ladas & Parry

[57] ABSTRACT

A method and device for controlling a bridge circuit for providing current or power to a load. The bridge comprises two transistors including flywheel diodes and connected in series between positive and negative power supply rails for conducting current to or from the load under control of a control drive circuit. An LC-circuit is connected between the bridge circuit and the load. The bridge voltage (E) of the connection between the two transistors and the current (I) through the inductance of the LC-circuit are monitored and a firing pulse is supplied to one of the transistors. When the current (I) through the inductance exceeds a preset value (I'), the transistors is turned OFF, whereupon the current of the inductance continues to flow another way through the flywheel diode of the opposite semiconductor member and consequently the bridge voltage (E) changes polarity a first time to the opposite rail polarity until the magnetic energy of the inductance has been terminated resulting in a second change of polarity of the bridge voltage (E) towards the first rail polarity. The change of the polarity of the bridge voltage (E) towards the first rail polarity is detected and another firing pulse is supplied at or shortly after said change.

10 Claims, 3 Drawing Sheets

METHOD AND MEANS FOR CONTROLLING A BRIDGE CIRCUIT

BACKGROUND OF THE INVENTION

1. Field of Invention

This invention relates to a new switch control method for the well-known bridge circuit, where two semiconductor switches and two flywheel diodes are connected in series in a bridge between a positive and a negative power supply rail. The invention also relates to a bridge circuit for performing said method.

2. Prior Art

A bridge circuit of the above-mentioned type usually comprises one or more sets of components and one such set of components is normally called one "leg" of the bridge circuit and sometimes a "half-bridge". Very often two legs are used in a "full-bridge", with the load connected between the two legs which are driven with opposite polarities. In three-phase systems, e.g. three-phase motor control circuits, three legs are used as is well-known. The present invention discloses one leg of a bridge circuit, whereby this leg may be used as a building block in all types of systems with any number of legs.

The new method and the new switch circuit according to this invention are especially adapted for using the POWER MOSFET transistor, where a flywheel diode is an integral part of the MOSFET transistor. However, the circuit may as well be used with any other type of semiconductor, such as bipolar transistors or thyristors, with external flywheel diodes.

The POWER MOSFET transistor, in the following simply named transistor, has an integral "reverse diode", which can be used as a flywheel diode in the above-mentioned bridge connection. This is very favourable, since it minimizes the number of circuit components.

However, the use of said reverse diode as a fly-wheel diode is not free from problems. Such an application which may cause trouble is the pulse width modulated inverter for AC motor drives having inductive load. The load current changes slowly, and may have the same polarity and be approximately constant during multiple bridge output pulses.

Suppose in such a case, that the upper transistor in a bridge circuit has been turned ON and has supplied a positive output current to the load. When the transistor is turned OFF, the inductive load current must find a new way through the lower flywheel diode. But, in this type of application, the flywheel current does not go to zero. The upper transistor must be turned ON while the lower flywheel diode is still conducting. Because of the internal transistor structure, details of which are not discussed here, the lower transistor may be unintentionally turned ON when the upper transistor turns ON which causes a bridge short circuit with catastrophic outcome. These are well-known facts and are described in the literature, see e.g. RCA Power MOSFET's Databook, pages 493-499 (1986), INTERNATIONAL IP. RECTIFIER Power MOSFET HEXFET® Databook, pages A-74-A-76 (1985), MOTOROLA SEMICONDUCTORS TMOS® Power MOSFET Transistor Data, pages A-30-A-31 (1985), and SIEMENS SIPMOS® Datenbuch 1984/85, pages 19-20.

Even with separate external flywheel diodes, the turn ON of the transistor is critical. In the turn ON moment, the transistor has to supply current to the output, and simultaneously supply reverse recovery current to the opposite diode. If the turn ON is fast, as it should be, it will be necessary for the transistor to supply more than twice the load current during the turn ON moment.

Some transistor manufacturers have designed special transistor versions for such applications, e.g. SIEMENS with the FREDFET (Fast-Recovery-Epitaxial-Diode-Field-Effect-Transistor). The internal reverse diode has been modified to a fast recovery diode, while the reverse diode normally used has a relatively slow recovery. This measure may partially overcome the problem, although it does not seem to remove the real source of problem.

SUMMARY OF THE INVENTION

The present invention discloses a new switch control method, which solves the above-mentioned problem in another way. The method may be used with all types of standard transistors. Of course the new switch method can be used with the abovementioned special transistors too.

The new switch method according to the present invention is based on the use of an LC-filter connected between the bridge and the load. This filter "isolates" the bridge from the load in such a way that the bridge current can be allowed to reach zero in each switch cycle, although the load current is approximately constant during one or multiple switch cycles.

The output filter has the further advantage that it protects the transistor junctions from external noise induced from the output cable. Further, the high frequency noise created by the bridge is isolated from the output cable.

In order to minimize the size of the LC-filter, the switch frequency should be much higher than the frequency of the load current. As an example, the load current in AC motor control has a maximum frequency of approximately 100 Hz, while the switch frequency may be around 1-1000 KHz.

Thus, the invention relates to a method for controlling a bridge circuit for providing current or power to a load. The bridge circuit comprises one or several legs, each comprising two semiconductor members connected in series between positive and negative power supply rails. Each semiconductor member comprises a switchable member for conducting current to or from the load in the forward direction of the semiconductor member under control of a control drive circuit, and a flywheel diode for conducting current in the opposite direction. In the following, the expression "bridge circuit" means one such leg.

According to the invention the method comprises the steps of connecting an LC-circuit between the bridge circuit and the load; monitoring the bridge voltage of the connection between the semiconductor members and the current through the inductance of the LC-circuit; supplying a firing pulse to one of said switchable members of said semiconductor members for initiating the conduction thereof; terminating the conduction of said switchable member when the current through the inductance exceeds a preset value, whereupon the current of the inductance continues to flow another way through the flywheel diode of the opposite semiconductor member and consequently the bridge voltage changes polarity a first time to the opposite rail polarity until the magnetic energy of the inductance has been terminated resulting in a second change of polarity of the bridge voltage towards the first rail polarity; sensing the change of the polarity of the bridge voltage towards the first rail polarity or otherwise detecting that the bridge or inductance current is zero and supplying another firing pulse at or after said change.

Preferably the current through the inductance is monitored by measuring the voltage difference over the inductance and calculating the current by substantially integrating the voltage difference by an integrating circuit. The preset value of the inductance current can be an external signal or can be obtained from a control amplifier based on a preset value of the required load voltage compared with the actual load voltage. The change of polarity towards the first rail polarity can be sensed by a voltage comparator sensing when the bridge voltage differs from the second rail polarity by a value which is less than half the voltage between the positive and negative rails. Preferably, the change of polarity towards the first rail polarity is sensed by two voltage comparators, one for each semiconductor member, whereby a window is generated in which window both comparators allow activation of the corresponding semiconductor member.

The invention also relates to a device for performing the above-mentioned method. The device comprises an LC-circuit connected between the bridge circuit and the load; a monitor circuit for monitoring the bridge voltage of the connection between the semiconductor members and the current through the inductance of the LC-circuit, said monitoring circuit comprising a first comparator for detecting when the current through the inductance exceeds a preset value and a second comparator for detecting when the bridge voltage changes polarity towards the corresponding rail polarity; the control and drive circuit being adapted to provide a firing pulse to one of said switchable members of said semiconductor members for initiating the conduction thereof, the control and drive circuit being adapted to terminate the conduction of said switchable member when said first comparator determines that the current through the inductance exceeds said preset value and to supply another firing pulse when said second comparator determines that the bridge voltage changes towards the corresponding rail polarity.

Preferably, the device comprises a calculating circuit for caculating the current of the inductance from the voltage over the inductance by substantially integrating said voltage and a control amplifier for obtaining the preset value of the current of the inductance by comparing the actual voltage over the load with a preset voltage and substantially integrating the difference. Moreover, the device comprises a voltage comparator for detecting when the bridge voltage differs from the second rail polarity by a value which is less than half the voltage between the positive and negative rails. A timer circuit may be adapted for inhibiting the conduction of the corresponding semiconductor member if the conduction thereof exceeds a predetermined time duration.

Thus, the turn ON of the relevant transistor takes place when the bridge current is zero and the upper transistor turns ON when the bridge voltage changes from minus to plus and the lower transistor turns ON when the bridge voltage changes from plus to minus. An advantage of the method according to the invention is that the two transistors can never be ON simultaneously.

BRIEF DESCRIPTION OF THE DRAWINGS

The invention is described in further details below by means of a preferred embodiment of the invention and with reference to the appended drawings.

DETAILED DESCRIPTION OF THE PREFERRED EMBODIMENT

Figure 3:
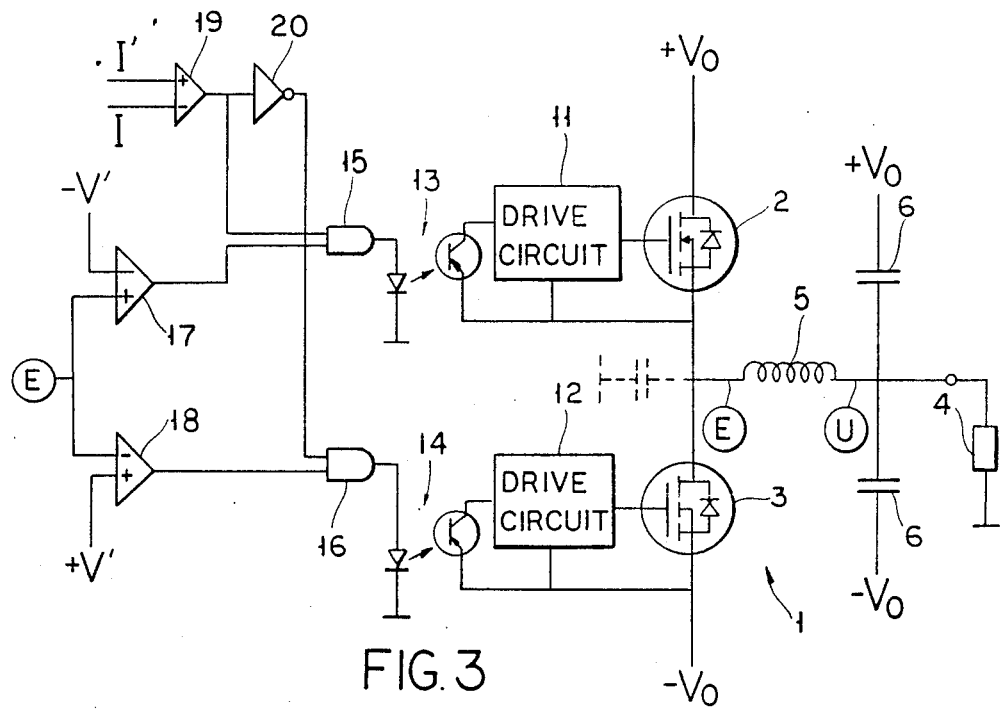
FIG. 3 is a circuit diagram of the preferred embodiment of the invention.

Turning firstly to FIG. 3, there is shown a circuit diagram of the preferred embodiment according to the invention. The diagram shows a bridge circuit 1 comprising two transistors 2, 3 connected to a load 4 through an LC-filter 5, 6.

Several systems may be connected in parallel to the load. If they have the same input signal, which is the preset value of current, they will share the load current equally. The separate systems do not have to operate in synchronism. Of course, several bridge transistors 2, 3 can be connected in parallel.

Figure 1:
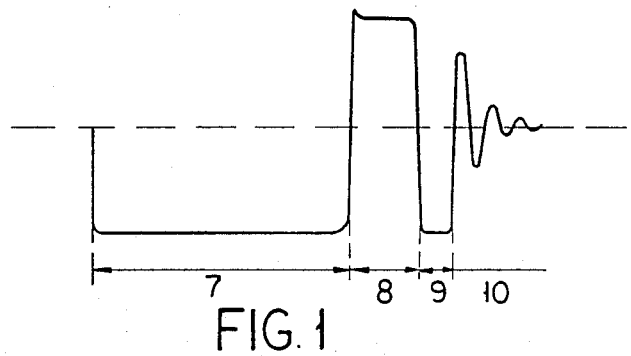
FIG. 1 is an oscilloscope view showing the behaviour of the bridge circuit after a pulse is applied to one of the transistors in the bridge circuit.

The bridge voltage E on the connection point between the transistors 2, 3 and the inductance 5 is shown by the diagram of FIG. 1. If the lower transistor 3 is switched ON and then OFF, there is provided a pulse during time period 7 and the bridge voltage E immediately goes to minus. When the pulse is terminated, the energy stored in the inductance must be released and forces the voltage E to the opposite polarity during time period 8, i.e. plus, and opens the flywheel diode of the upper transistor 2. When the energy of the inductance 5 has been terminated, the flywheel diode of the upper transistor 2 is blocked. However, the blockage cannot take place immediately but a current in the opposite direction must flow in order to charge or recover the flywheel diode (reverse recovery current). This opposite current induces a new but weaker magnetic field in the inductance 5 which in turn gives rise to an opening of the flywheel diode of the first-mentioned lower transistor 3 as shown at time period 9. Then, the energy oscillates between the inductance 5 and the leakage capacitances, primarily the transistor output capacitances (not shown in FIG. 3) in the system as shown to the right during time period 10 until attenuated.

It is pointed out that this sequence of events takes place due to the fact that an LC-filter has been connected between the bridge and the load.

It appears from FIG. 1 that the oscilloscope diagram after the termination of the pulse is a damped oscillation, the amplitude of which being cut by the flywheel diodes a plus and minus the rail voltage.

The present invention uses this sequence of events in order to avoid or circumvent the above-mentioned problem It is noted that it should be completely safe to turn on the lower transistor during the time period 9, while the lower flywheel diode is open and the flywheel diode of the opposite transistor is closed. The transistor then takes over the conduction from the flywheel diode and a new sequence follows.

Figure 2:
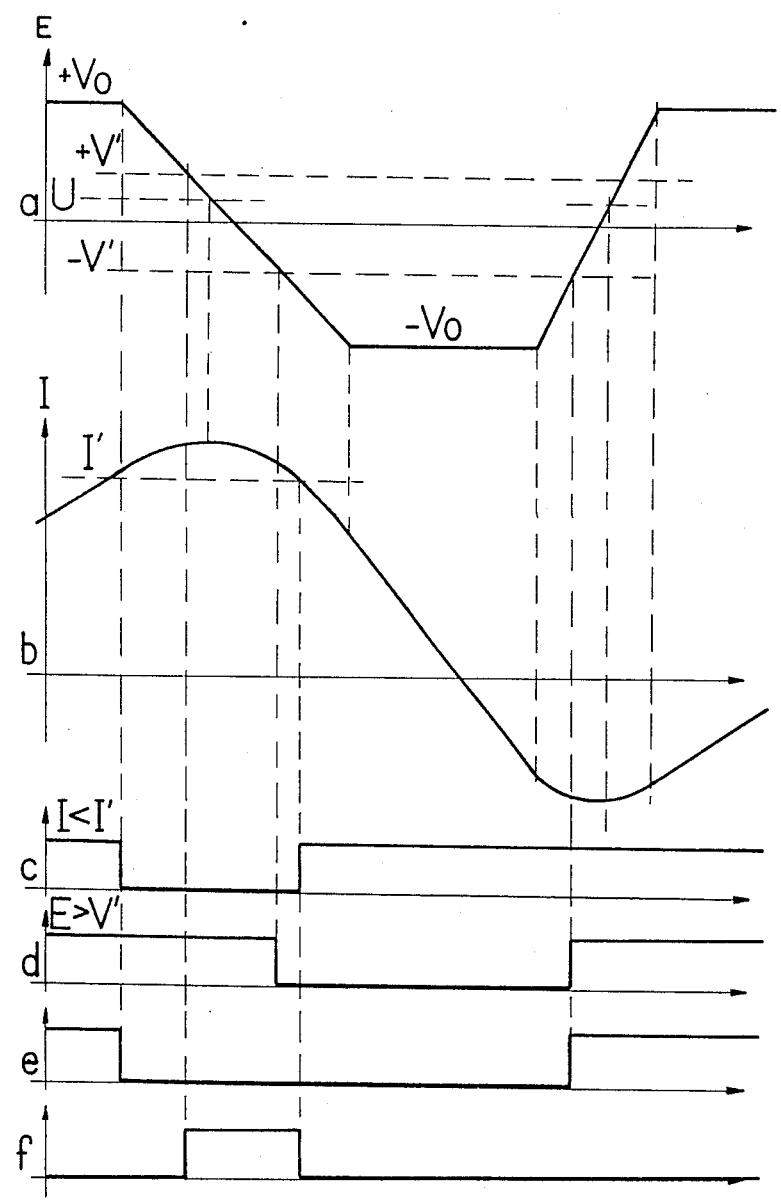
FIG. 2 is a time diagram showing the method according to the invention.

In FIG. 2 there is shown a time diagram of the method according to the invention. According to FIG. 2, the upper transistor is initially conducting (in FIG. 1 the lower transistor is conducting). The procedure is completely the same and there is no principal difference between the method using the upper or the lower transistor. For positive output current the upper transistor is turned ON and the flywheel current flows through the lower diode. For negative output current the lower transistor is turned ON and the flywheel current flows through the upper diode.

The upper diagram 2a shows the voltage E. It should be noted that the time axis is not linear but is heavily expanded at the rise and fall times. Diagram 2b shows the current I through the inductance 5.

The upper transistor is conducting and the voltage E is at plus during the time period I. The current I through the inductance 5 rises approximately linearly (actually exponentially). When the current I reaches a preset value I', a first comparator changes its state from logic "1" to logic "0" as shown in diagram 2c. The comparator controls the transistor and turns it OFF and the voltage decreases according to the switching characteristics of the transistor as shown during time period II. The voltage E passes below zero and reaches minus and the flywheel diode of the negative transistor opens at the start of the time period III as explained with reference to FIG. 1. The energy of the inductance is terminated during time III and the current through the inductance is reversed in order to turn OFF the flywheel diode of the negative transistor (reverse recovery current). When the flywheel diode of the negative transistor is turned OFF, the voltage E rises during time period IV until the positive flywheel diode opens. This rise of voltage is sensed by a second comparator, which turns the positive transistor ON for a further sequence during time period V. The output of the second comparator is shown in 2d. When the voltage E drops below $-V'$, the comparator outputs a logical "0" as shown. When both comparators are outputting a logical "1", the positive transistor is turned ON. This procedure will be further explained below in connection with FIG. 3.

It is noted that the switch frequency is not constant but is high at low loads and decreases with increasing loads.

In FIG. 3 there is shown a circuit diagram of a presently preferred embodiment of the invention. It is contemplated that this circuit can be made at least partially as a custom designed integrated circuit or Application Specific Integrated Circuit ASIC and thus, the circuit solutions shown are only exemplary for explaining the invention.

The bridge circuit is shown to the right in FIG. 3 as explained above. Each transistor is driven by a drive circuit 11, 12. The drive circuits are galvanically isolated from the remaining control circuitry by opto-couplers 13, 14 shown as a light emitting diode and a photo transistor.

Each opto-coupler is connected to the output of an AND gate 15, 16 having two inputs. One of the inputs is connected to a first comparator 19, which compares the actual current I through the inductance 5 with a preset value I'. When the actual current I is below the preset value I', the comparator 19 outputs a logical "1" to AND gate 15. When the preset current I' is exceeded, the output from AND gate 15 is terminated as shown at time II in FIG. 2 at 2c. The transistor 2 is then turned OFF. The output from the first comparator 19 is inverted by inverter 20 and connected to the lower AND gate 16.

The second input of each AND gate 15, 16 is connected to a second comparator 17, 18, corresponding to the second comparator mentioned above. The comparator compares the voltage E with preset limit values $-V'$ and $+V'$ ($V'$ is a positive value), respectively, as shown in FIG. 3. The positive comparator 17 (the upper) outputs a logical "1" when the voltage E is above the limit $-V'$ and the negative comparator 18 outputs a logical "1" when the voltage E is below the limit $+V'$. Thus, there is a window between $+V'$ and $-V'$ where both comparators outputs a logical "1". The purpose thereof will be explained below.

Figure 4:
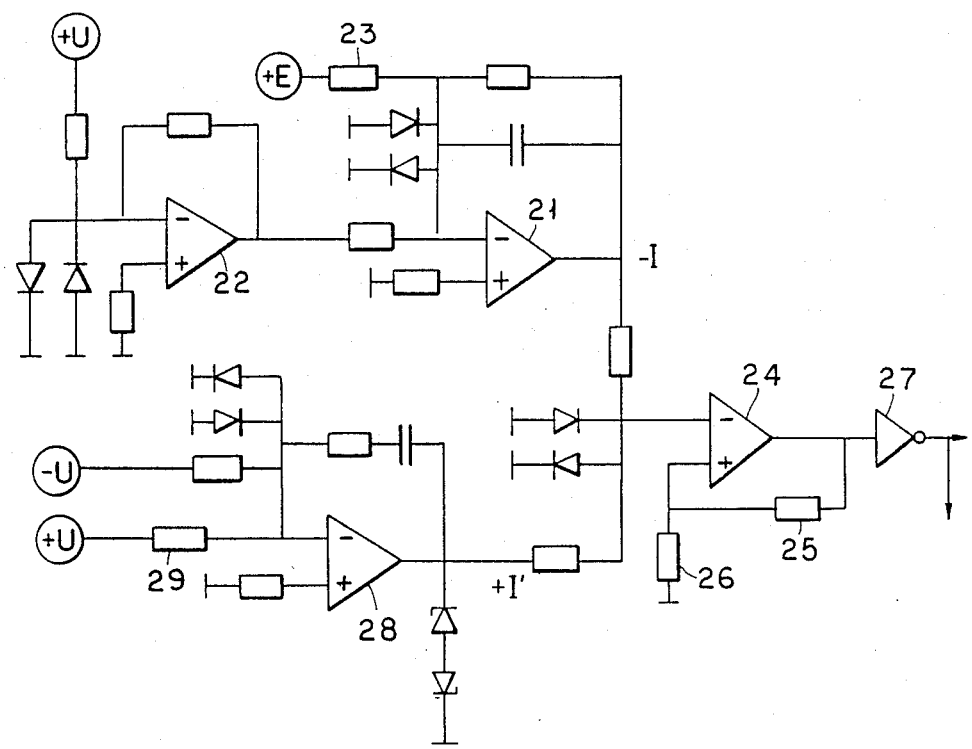
FIG. 4 is a partial circuit diagram showing the calculating circuit and the control amplifier of the preferred embodiment.

In FIG. 4 there is shown a calculating circuit and a control amplifier for calculating the actual current I and the preset current I'. The preset value can be any value between plus and minus the maximum bridge current. Consequently, the bridge circuit is short-circuit proof. Although not shown, it is possible to have an adjustable current limit.

The actual current (I) through the inductance can be measured by conventional means, or calculated by analog or digital circuits. If the difference voltage (E−U) across the inductance is measured, the current (I) can be calculated according to the following formula:

$$I = (E - U)/(R + sL)$$

where
  I = inductance current
  E = bridge voltage
  U = output voltage to the load
  R = resistance of the inductance
  L = inductance
  s = Laplace operator The resistance of the inductance should be as low as possible, which however creates a problem in the calculating circuit. The calculation formula can be seen as a "transfer function" for the calculating circuit. If R is small, the DC gain of the transfer function is very high. Then any small but unavoidable offset in the measuring or calculating circuits will be amplified to an unacceptable value.

It is possible to modify the calculating formula, by increasing R for example 10 times, which decreases the DC gain and thus the influence of possible offset voltages, and adjusting L so that the calculated value will be approximately correct during the maximum pulse time. Thus, the calculating error will be significant only for times longer than the maximum pulse time, which however is outside the operation area of the calculating circuit and makes no harm.

A calculation circuit for calculating according to the above-mentioned formula is shown in FIG. 4. The voltage U is subtracted from the voltage E in a first OP-amplifier 21. The voltage U is first inverted and scaled by inverter 22 and then connected to the summing input of the OP-amplifier 21 at the negative input thereof. The voltage E is connected to the same summing input through a scaling resistance 23. The OP-amplifier is connected substantially as an integrator according to the formula above and integrates the difference between voltages E and U. The result is the inverted inductance current (−I).

The preset current I' can be provided or generated in any conventional manner. The actual current (I) and the preset current (I') are transferred to the summing input of a fast comparator 24 and the output thereof is the difference between I and I'. The comparator has very high gain and thus, the output thereof is either high or low. The comparator is further provided with a certain hysteres by the resistances 25 and 26. The output from the comparator is inverted and buffered by the inverter 27 for providing I'−I which is the output signal provided by the first comparator 19 in FIG. 3.

The circuitry of the entire system described above operates at a current generator delivering output current to the load. It may be used in this way with preset value of the current I' as the input control signal. However, it is often preferred to have a voltage generator and the present system is easily converted to a voltage generator. The output voltage U is measured and fed back to a conventional PI-regulator (Proportional Integrating), the output of which is the preset current I'. Such an integrating regulator will automatically correct for DC-offsets in the current calculating circuit.

As shown in FIG. 4, the preset value I' of the current can be calculated by a control amplifier from the actual output voltage to the load U and a preset output voltage U'. A voltage corresponding to the negative value of the preset output voltage U' is fed to the negative input of a second OP-amplifier 28. The actual output voltage U is also fed to said negative input through a scaling resistor 29. The difference between the actual output voltage and preset output voltage U-U' is substantially integrated by the OP-amplifier 28 and the output thereof corresponds to the preset current I' and is fed to the negative input of the comparator 24. The Zener diodes at the output of the OP-amplifier 28 limit the maximum preset current I'.

Figure 5:
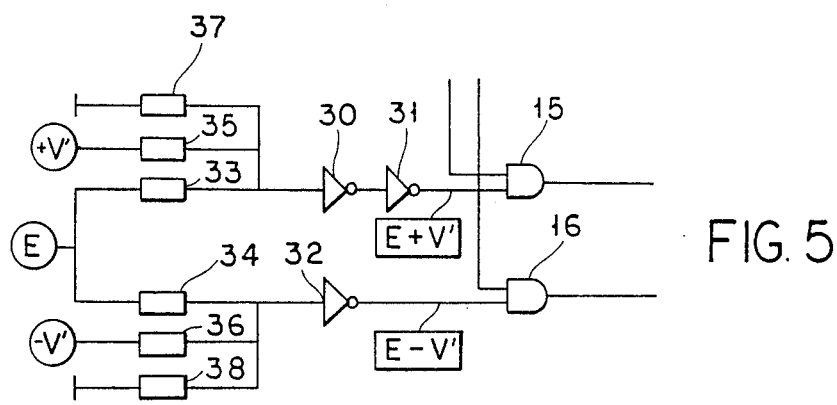
FIG. 5 is a circuit diagram of a comparator of the preferred embodiment.

In FIG. 5, there is shown a current corresponding to the comparators 17 and 18 in FIG. 3. The comparators are made in TTL-circuits and comprises three inverters 30, 31 and 32. The bridge voltage E is fed to a first resistor 33 and 34 for each branch. A voltage corresponding to the desired offset from the zero voltage is fed to a second resistor 35 and 36 for each branch. Zero voltage is defined as midway between the positive and the negative rail. The junction between the first and the second resistor is fed to the input of one inverter 30 or 32, the input of which also being grounded by a third resistor 37 and 38. The result is that when the bridge voltage drops so that E+V' is below zero, the upper inverter 31 outputs a logic "0" and closes the AND gate 15. When the bridge voltage rises so that E−V' is above zero, the lower inverter 32 outputs a logic "0" and closes the AND gate 16 (V' is a positive value). The further operation should be evident from the description in connection with FIG. 3.

If the load impedance is too high (or the maximum output voltage is too low) it is impossible to output the preset current to the load. In that case, the output voltage goes to maximum, and the corresponding transistor remains constantly ON, which may be undesirable. The maximum pulse time can be limited by two retriggerable timers, one for each bridge transistor.

Figure 6:
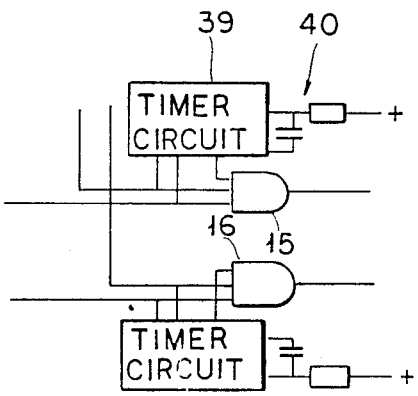
FIG. 6 is a partial circuit diagram showing a timer of the preferred embodiment.

In FIG. 6, there is shown a timer circuit 39 for terminating a pulse if the duration thereof exceeds a predetermined value whereby each AND gate 15, 16 is provided with a third input, which is connected to the output of a retriggerable timer, the two trigger inputs of which being connected to the two other inputs of the corresponding AND gate. If the inputs of the timer falls for a certain time duration dictated by an RC-circuit 40, the timer outputs a logic "0", which terminates the pulse. Otherwise, the timer outputs a logic "1".

It is evident that the current I is approximately triangular, with the peak value twice the mean value. It is the mean value that flows to the external load. If the switch transistors are assumed to have constant ON resistance, the triangular current waveform causes a power loss in the bridge transistors during conduction that is ⅓ greater than it would have been with rectangular current waveform.

It is also noted that the switching ON of the transistor takes place when the current in the bridge is zero (or very close to zero) This fact minimizes the power dissipation of the transistor at the switch ON moment, which is an essential advantage. In the present invention, the transistors are always turned on in the right moment when the opposite flywheel diode current is zero.

As mentioned above, there is a window, where both comparators 17, 18 are outputting a logic "1". The reason for this is that when the power is turned on to the circuit, the oscillations must start. Dependent on tolerances of the components 21, 22, 24, 27, 28 etc, the output of comparator 24 will be either high or low at the initiation of the system. In either cases, the corresponding AND gate will be opened and the oscillations will start, since the other input to both gates are at logic "1".

It is noted in FIG. 2f that a lower firing pulse is generated unintentionally. However, the duration of said firing pulse is very short. In a practical circuit, the influence of this firing pulse is slightly delayed and turns the lower transistor ON when the lower flywheel diode is already conducting. However, when the preset current is zero, the whole system will oscillate by help of these short pulses. When one transistor is turned OFF, the other transistor is turned ON, then the first transistor is again turned ON, etc. The pulse times will be dependent on the delays in the various circuitry and the system will oscillate at a high maximum frequency, which in the present embodiment can be around 300 KHz.

It is also noted that the diagram in FIG. 2 is idealized in that the time delays in the different circuitry is not taken account of. However, such delays only improve the safety of the present circuit and have no harmful influence. As an example, study FIGS. 2c and 2d. If the rising edge in FIG. 2c occurs before the falling edge in FIG. 2d, a new very short upper firing pulse will unintentionally be generated. This is a type of electronic "race" that sometimes occurs in pulse circuits. Of course, the designer must observe the possibility of such situations and take appropriate counter measures. In this system, it is noted that it is only necessary that the transistor is turned on during the time period 9 in FIG. 1. Thus, there is sufficient time for any delays.

It is also noted that the bridge system is able to operate in a generative as well as a regenerative mode, feeding energy to the load or receiving energy from the load back to the power supply rails.

Hereinabove, a preferred embodiment of the invention has been described in details. However, it is clear to a skilled person that many details may be modified without departing from the scope of the invention. For example, the sensing of the direction of change of the bridge voltage E can be determined by a differentiator instead of a comparator. It may be possible to replace the sensing of the voltage change by sensing when the current in the bridge or inductance is zero and firing the transistor shortly thereafter.

The present embodiment has a rail voltage of about $2\times 155$ V and a maximum output current of 25 A (mean value 12.5 A). The inductance is approximately 40 $\mu$H and the resistance of the inductance is about 10 m$\Omega$. The capacitance is about 10 $\mu$F. It is preferred to connect the capacitances to both rails, in which case the capacitors also filters the rail voltage. The magnetic field in the inductance is about 0.2 T. The frequencies are from about 1-1000 KHz, preferably from 5-300 KHz and changes depending on the load. The above mentioned values are only given as example and can be modified within large limits when improved components are manufactured, specifically the semiconductors and the inductance core. The load can be connected between the output and ground or in any other conventional manner to other legs in the bridge system.

An apparatus according to the present invention is useful for delivering output voltage and current of both polarities. If only one polarity is required, as for example in conventional DC power supply units, the invention can still be used. Then, all those components, which are necessary for the opposite polarity, can be removed, resulting in a simpler circuit.

Further modifications should be obvious to a skilled person. The invention is only limited by the appended claims.

What is claimed is:

1. A method for controlling a bridge circuit for providing current or power to a load, said bridge circuit comprising one or several legs, each comprising two semiconductor members connected in series between positive and negative power supply rails, each semiconductor member comprising a switchable member for conducting current to or from the load in the forward direction of the semiconductor member under control of a control drive circuit, and a flywheel diode for conducting current in the opposite direction, the method comprising the steps of:
   connecting an LC-circuit between the bridge circuit and the load;
   monitoring the bridge voltage (E) of the connection between the semiconductor members and the current (I) through the inductance of the LC-circuit;
   supplying a firing pulse to one of said switchable members of said semiconductor members for initiating the conduction thereof;
   terminating the conduction of said switchable member when the current (I) through the inductance exceeds a preset value (I'), whereupon the current of the inductance continues to flow another way through the flywheel diode of the opposite semiconductor member and consequently the bridge voltage (E) changes polarity a first time to the opposite rail polarity until the magnetic energy of the inductance has been terminated resulting in a second change of polarity of the bridge voltage (E) towards the first rail polarity,
   sensing the change of the polarity of the bridge voltage (E) towards the first rail polarity or otherwise detecting that the bridge or inductance current is zero and supplying another firing pulse at or after said change.

2. A method according to claim 1, further comprising the steps of monitoring the current (I) through the inductance of measuring the voltage difference (E−U) over the inductance and substantially integrating the voltage difference by an integrating circuit.

3. A method according to claim 1, further comprising the step of obtaining the preset value of the inductance current (I') by a control amplifier based on a preset value of the required load voltage (U') compared with the actual load voltage (U).

4. A method according to claim 1, further comprising the step of sensing of the change of polarity towards the first rail polarity by a voltage comparator sensing when the bridge voltage (E) differs from the second rail polarity by a value which is less than half the voltage between the positive and negative rails.

5. A method according to claim 4, further comprising the step of sensing the change of polarity towards the first rail polarity by two voltage comparators, one for each semiconductor member, whereby a window is generated, in which window both comparators allow activation of the corresponding semiconductor member.

6. A means for controlling a bridge circuit for providing current or power to a load, said bridge circuit comprising one or several legs, each comprising two semiconductor members connected in series between positive and negative power supply rails, each semiconductor member comprising a switchable member for conducting current to or from the load in the forward direction of the semiconductor member under control of a control drive circuit, and a flywheel diode for conducting current in the opposite direction by said means comprising
   an LC-circuit connected between the bridge circuit and the load;
   a monitor circuit for monitoring the bridge voltage (E) of the connection between the two semiconductor members and the current (I) through the inductance of the LC-circuit, said monitoring circuit comprising a first comparator for comparing when the current (I) through the inductance exceeds a present value (I') and a second comparator for comparing when the bridge voltage (E) changes polarity towards the corresponding rail polarity;
   a drive circuit being adapted to provide a firing pulse to one of said switchable members of said semi-conductor members for initiating the conduction thereof;
   said control drive circuit being adapted to terminate the conduction of said switchable member when said first comparator determines that the current through the inductance exceeds said preset value (I') and to supply another firing pulse when said second comparator determines that the bridge voltage (E) changes towards the corresponding rail polarity.

7. A means according to claim 6, further comprising a calculating circuit for calculating the inductance current (I) from the voltage (E−U) over the inductance by substantially integrating said voltage.

8. A means according to claim 6 further comprising a control amplifier for obtaining the preset value (I') of the current through the inductance by comparing the actual voltage (U) over the load with a preset voltage (U') and substantially integrating the difference.

9. A means according to claim 6, further comprising a voltage comparator for comparing when the bridge voltage (E) exceeds the second rail polarity by a value which is less than half the voltage between the positive and negative rails.

10. A means according to claim 6, further comprising a timer circuit for inhibiting the conduction of the corresponding semiconductor member if the conduction thereof exceeds a predetermined time duration.

* * * * *